United States Patent
McCarthy et al.

(10) Patent No.: US 8,789,110 B2
(45) Date of Patent: *Jul. 22, 2014

(54) PERSONALIZED MEDIA CHANNEL

(71) Applicant: AT&T Intellectual Property I, L.P., Atlanta, GA (US)

(72) Inventors: Mary C. McCarthy, San Antonio, TX (US); Roland Noll, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,384

(22) Filed: Nov. 30, 2012

(65) Prior Publication Data

US 2013/0091523 A1   Apr. 11, 2013

Related U.S. Application Data

(63) Continuation of application No. 12/016,854, filed on Jan. 18, 2008, now Pat. No. 8,365,225.

(51) Int. Cl.
*H04N 5/445* (2011.01)

(52) U.S. Cl.
USPC .................................. 725/46; 725/34; 725/61

(58) Field of Classification Search
USPC ............................................. 725/34, 46, 61
See application file for complete search history.

(56) References Cited

U.S. PATENT DOCUMENTS

| | | | | |
|---|---|---|---|---|
| 5,534,911 | A * | 7/1996 | Levitan | 725/46 |
| 7,131,134 | B2 * | 10/2006 | Trovato et al. | 725/46 |
| 7,188,355 | B1 * | 3/2007 | Prokopenko et al. | 725/46 |
| 7,814,144 | B2 * | 10/2010 | Koyama et al. | 709/203 |
| 2002/0056086 | A1 | 5/2002 | Yuen | |
| 2002/0092026 | A1 | 7/2002 | Janniello et al. | |
| 2002/0144267 | A1 * | 10/2002 | Gutta et al. | 725/46 |
| 2002/0178448 | A1 * | 11/2002 | Te Kiefte et al. | 725/46 |
| 2003/0067554 | A1 * | 4/2003 | Klarfeld et al. | 348/461 |
| 2003/0101449 | A1 | 5/2003 | Bentolila et al. | |
| 2003/0101451 | A1 | 5/2003 | Bentolila et al. | |
| 2003/0163817 | A1 | 8/2003 | Han | |
| 2004/0019908 | A1 | 1/2004 | Williams et al. | |
| 2005/0084082 | A1 | 4/2005 | Horvitz et al. | |
| 2005/0120368 | A1 | 6/2005 | Goronzy et al. | |
| 2005/0160462 | A1 * | 7/2005 | Shikata et al. | 725/58 |
| 2006/0004622 | A1 | 1/2006 | Fanelli et al. | |
| 2006/0095938 | A1 | 5/2006 | Joo | |
| 2006/0212900 | A1 * | 9/2006 | Ismail et al. | 725/34 |
| 2006/0212904 | A1 * | 9/2006 | Klarfeld et al. | 725/46 |
| 2007/0093263 | A1 | 4/2007 | Song et al. | |

(Continued)

*Primary Examiner* — Pankaj Kumar
*Assistant Examiner* — Timothy Newlin
(74) *Attorney, Agent, or Firm* — Jackson Walker L.L.P.

(57) ABSTRACT

A multimedia processing device (MPD) includes a relevance engine that is adapted to track a user's viewing preferences over time and to automatically determine which of the programs available in a given time slot is most probably preferred by that user. The relevance engine can then create a sequential play list, with each entry in the list corresponding to the program the user most likely wants to watch at that time. The user can thus be provided with a personalized multimedia channel (PMC) with the play list providing the program for each time slot. The user may be enabled to "tune" to the PMC like any other channel. When the user "tunes" to the PMC, the MPD will take the appropriate action to display the program selected by the PMC.

20 Claims, 6 Drawing Sheets

(56) References Cited

U.S. PATENT DOCUMENTS

| | | |
|---|---|---|
| 2007/0094682 A1 | 4/2007 | Kim et al. |
| 2008/0115168 A1* | 5/2008 | Adwankar et al. ............ 725/46 |
| 2009/0113472 A1* | 4/2009 | Sheth et al. .................... 725/34 |
| 2009/0178081 A1* | 7/2009 | Goldenberg et al. .......... 725/46 |

* cited by examiner

PERSONALIZED MEDIA CHANNEL

The present patent application is a continuation of U.S. patent application Ser. No. 12/016,854, filed Jan. 18, 2008, the entirety of which is hereby incorporated by reference.

BACKGROUND

1. Field of the Disclosure

The present disclosure relates to multimedia programming and more particularly to multimedia content distribution networks.

2. Description of the Related Art

Some services for delivering television and other multimedia content, including cable, digital cable, satellite, and internet protocol television (IPTV) services, provide an electronic programming guide (EPG). An EPG is a graphical display of the programs provided on each station during indicated time intervals. An EPG allows users to see what programs are available.

DESCRIPTION OF THE EMBODIMENT(S)

A user of modern television programming packages may receive the programming via a number of delivery mechanisms, including standard cable, digital cable, satellite, or IPTV. When users have access to an EPG, they may be presented with a number of programming options for any given time slot. Depending on the programming package, the number of programming options may vary from only a handful of channels to hundreds of channels or more. When users select programs, they create evidence of their preferences for selected programs over the other available programs.

In one aspect, a disclosed media processing device (MPD), which may be implemented as a set top box, includes a relevance engine adapted to track user viewing preferences over time and to automatically determine which of the available programs in a given time slot is the most probably preferred program. The relevance engine can then create a list of most probably preferred programs, with each entry in the list representing the program the user most probably wants to watch at that time. The MPD can then provide a personalized multimedia channel (PMC), which plays the most probably preferred program for each time slot, and includes the PMC in the EPG. The MPD enables users to "tune" to the PMC like any other channel. When users tune to the PMC, the MPD will take the appropriate action to display the program selected by the relevance engine. For example, given a system such as cable or satellite, where a multiplexed signal includes a plurality of available programs, selecting the PMC may cause the MPD to tune to the actual channel providing the most probably preferred program selected by the relevance engine. In IPTV systems, selecting the PMC may cause the end-user device to request and stream the most probably preferred program. In each of these systems, the PMC enables users to select the most probably preferred program at any time by simply selecting the PMC.

In another aspect, a disclosed MPD may collect additional data to determine a user's preferences. For example, the MPD may allow a user to accept or reject programs presented by the PMC. If a user rejects a program, the PMC could then display the program it computes to be the next-most-probable choice. This sort of direct, targeted feedback would provide additional data for the relevance engine to work with. In yet another aspect, the MPD may allow a user to manually enter specific preferences. For example, a user might enter the names of preferred actors or actresses, preferred directors, preferred genres, preferred program lengths, or preferred formats and corresponding dislikes. The relevance engine could incorporate the explicitly indicated preferences and dislike to provide further guidance for identifying most probably preferred programs.

Embodiments of a PMC will now be described with particular reference to the enclosed figures.

Figure 1:
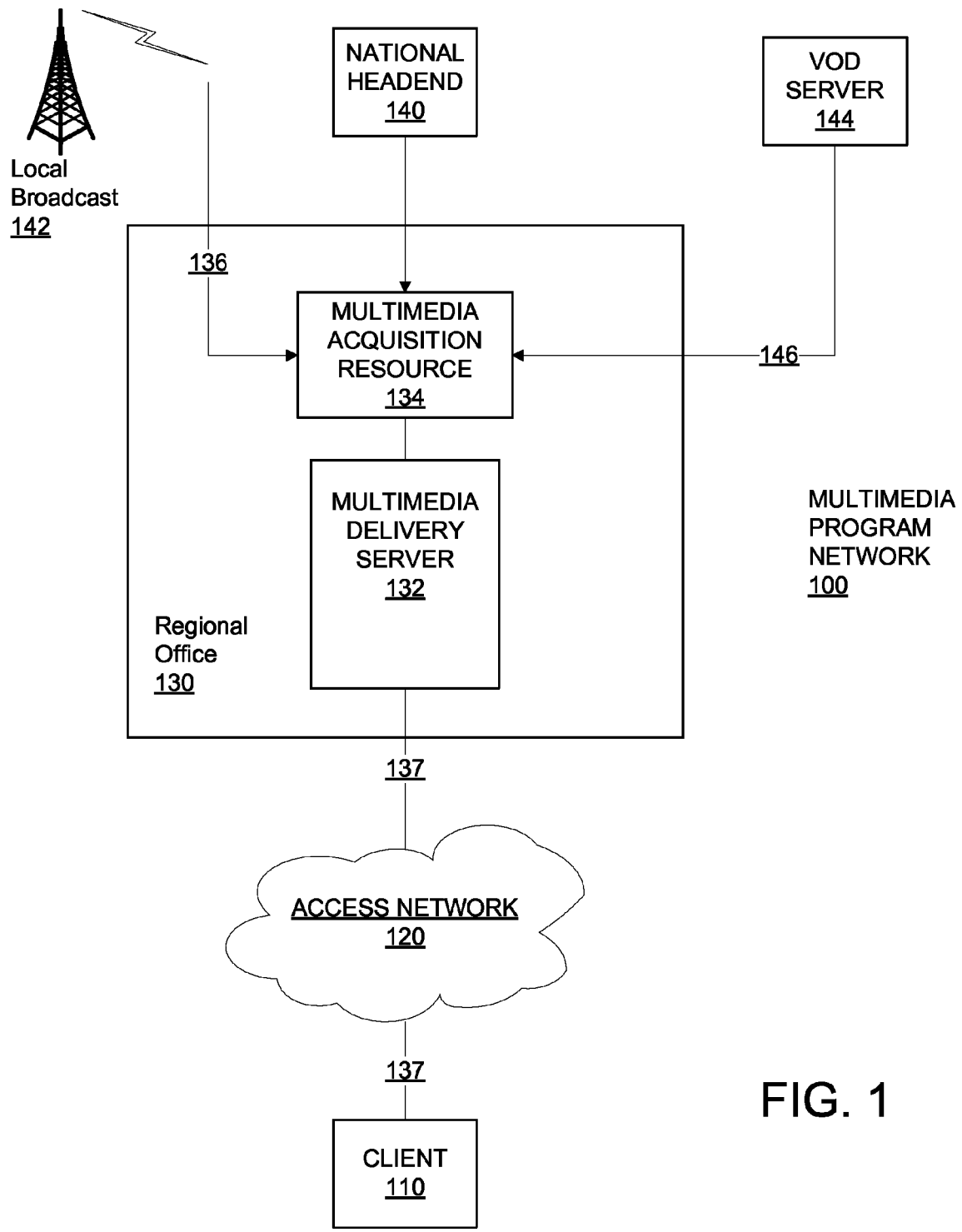
FIG. 1 is a block diagram of selected elements of an embodiment of a multimedia program network.

Turning to FIG. 1, selected elements of an embodiment of a multimedia program network 100 are depicted. Multimedia program network 100 includes a client 110 connected to a regional office 130 of a multimedia service provider through an access network 120. In the depicted embodiment, regional office 130 includes a multimedia acquisition resource 134 that acquires multimedia content from a plurality of sources. These sources may include a local broadcast 142, a national headend 140, and a VOD server 144. Multimedia content acquired by acquisition resources 134 is provided to multimedia delivery server 132, which may select content for delivery to client 110 and process and/or format the content for transmission over access network 120. In some instances, content processing performed by multimedia delivery server 132 may including encoding a multimedia stream received from multimedia acquisition resource 134 to compress, encrypt, or compress and encrypt the content. In other cases, the stream received from multimedia acquisition resources 134 may be in an encoded form as it is sent to multimedia delivery server 132. Multimedia delivery server 132 then transmits the encoded programming stream 137 to a client 110 via access network 120. In IPTV networks, access network 120 may include unshielded twisted pair cabling, fiber optic cabling, a combination thereof, or another suitable medium. In cable-based systems, access network 120 may include coaxial cabling.

Figure 2:
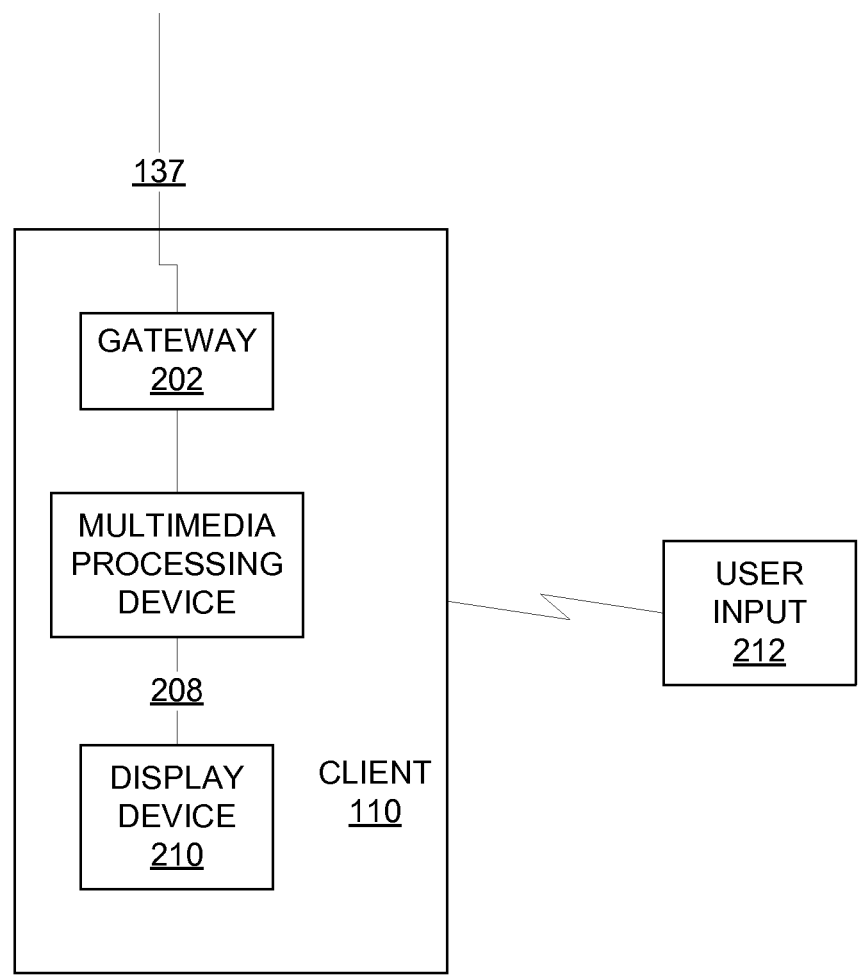
FIG. 2 is a block diagram of selected elements of an embodiment of client-side equipment for use with a multimedia program network.

Turning to FIG. 2, there is shown a block diagram of selected elements of an embodiment of a client 110. A gateway 202 interfaces the client 110 to the access network 120 (FIG. 1) to receive programming stream 137. Gateway 102 may include firewall functionality, routing functionality, network address translation functionality, or a combination thereof. Gateway 202 may implemented within a conventional broadband modem, a wireless or wireline router, or elsewhere. Gateway 102 may include a network protocol stack and may perform at least some network protocol processing of programming stream 137 in Internet Protocol (IP) or other packet switched embodiments of access network 120. A multimedia processing device (MPD) 206 receives multimedia data from the gateway 202 and also receives user input 212 from, for example, a remote control device or a front panel button. MPD 206 may filter and/or decode content contained in the multimedia data provided by the gateway 202 and then transmit the selected content 208 to the display device 210.

Figure 3:
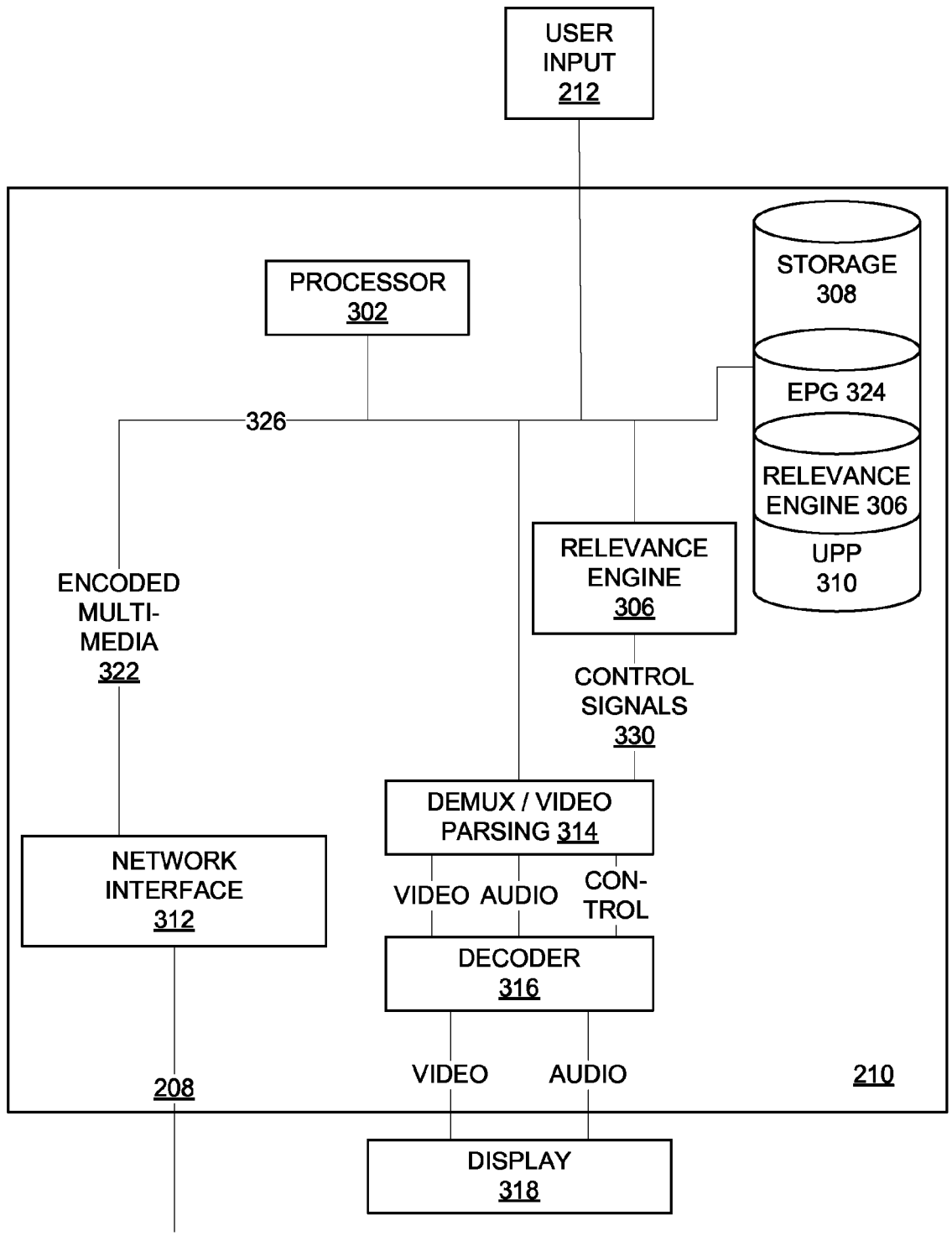
FIG. 3 is a block diagram of selected elements of an embodiment of a multimedia processing device suitable for providing a personalized multimedia channel for use with a multimedia program network.
Figure 4:
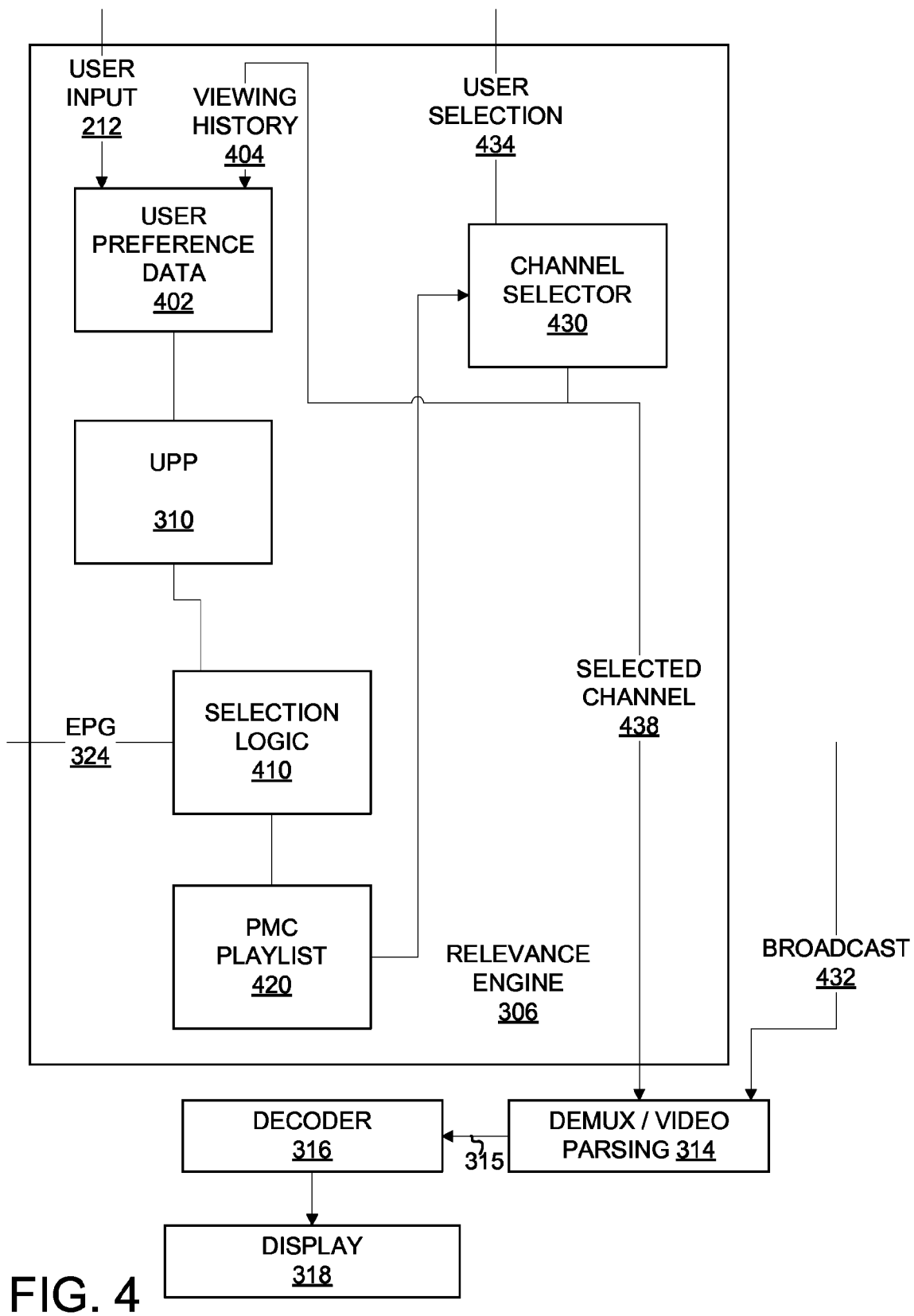
FIG. 4 is a block diagram selected elements of an embodiment of a relevance engine for use with a broadcast network.

Turning to FIG. 3, a block diagram of selected elements of an embodiment of MPD 210 is depicted. The depicted embodiment of MPD 210 includes a network interface 312 that receives a multimedia data stream 208 that has been transmitted by gateway 202 (FIG. 2). The network interface 312 may separate the multimedia data stream 208 into encoded multimedia data 322, which is provided on a system bus 326. Processor 302 provides programmable logic and may be a micro-processor, central processing unit, application-specific integrated circuit, or other programmable processing device. Processor 302 is communicatively coupled to storage 308 which includes a stored user preference profile (UPP) 310 and EPG data 324 and computer executable instructions that implement a relevance engine 306. The UPP 310 may be provided to the relevance engine 306 along with EPG data 324. The relevance engine 306 may be adapted to be responsive to user input and to compare the UPP 310 to EPG data 324 to create a PMC play list 420 (FIG. 4). Demux/video parsing unit 314 receives encoded multimedia stream 322 and provides an encoded video stream, an encoded audio stream, and control data to decoder 316. Decoder 316 converts the encoded streams to a native NTSC or PAL format. The decoder 316 then provides the decoded stream to display 318. MPD 210 may include at least some elements of a set top box.

Turning to FIG. 4, there is shown a block diagram of selected elements of an embodiment of a relevance engine 306. User inputs 212 and user viewing history 404 may be provided to form user preference data 402. The user preference data 402 are then used to form or update a UPP 310. The UPP 310 is provided to selection logic 410 which also receives EPG data 324. The selection logic 410 may operate on a number of discrete time slots. For each discrete time slots, the selection logic 410 will compare the UPP 310 to the available programs for that time slot as described by the EPG data 324, and may determine which of the available programs for that time slot is most probably desired by the user. These selections are then used to form a PMC play list 420. PMC play list 420 is provided to a channel selector 430 which also receives a user selection 434. The channel selector 430 may determine whether the PMC has been selected by the user, and if so, then channel selector 430 will provide the PMC as selected channel 438. If the PMC has not been selected but instead the user has selected a different channel, then that channel will be provided as the selected channel 438. The selected channel 438 is provided to demux/video parsing unit 314. In some embodiments, such as cable and satellite, demux/video parsing 314 receives a broadcast 432 that includes a plurality of channels that must be tuned. In these embodiments, demux/video parsing unit 314 then uses selected channel 438 to tune the selected content from out of the broadcast 432 and provide selected content 315 to decoder 316. The decoder decodes the selected content 315 and provides it to the display 318.

Figure 5:
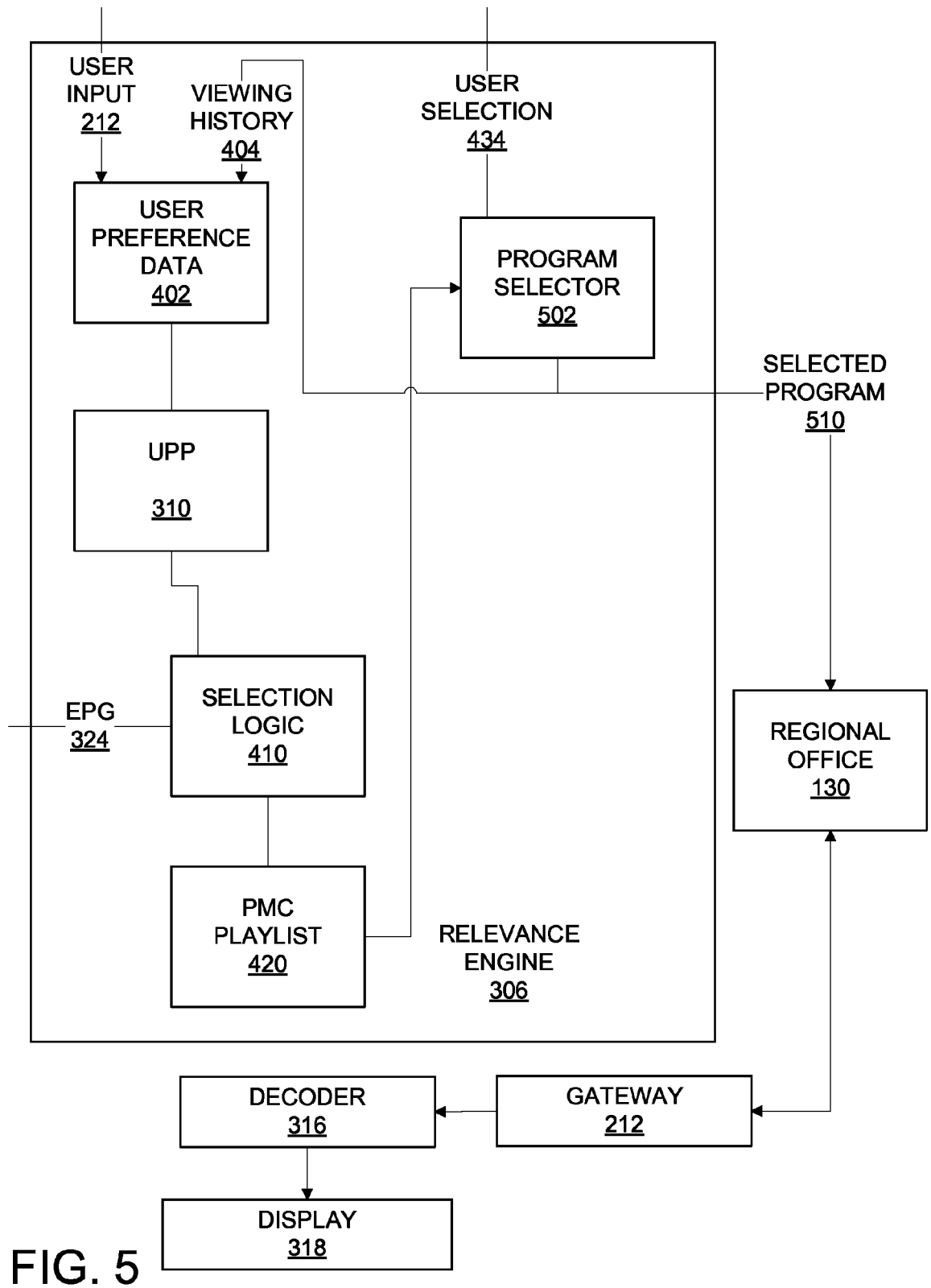
FIG. 5 is a block diagram selected elements of an embodiment of a relevance engine for use with a video-on-demand network.

Turning to FIG. 5, there is shown another embodiment of a relevance engine 306 adapted for use with an IPTV embodiment. This embodiment of relevance engine 306 varies from FIG. 4 in that rather than receiving a consolidated stream with a plurality of programs and requiring the device to tune out all but the selected program, in this embodiment a specific program is selected, and only the selected program is provided over the network. So in this embodiment, relevance engine 306 includes a program selector 502 rather than a channel selector 430. The program selector 502 works similarly to the channel selector 430. The program selector 502 will receive user selection 434 and determine whether to provide a manually selected program or to provide the program determined by the PMC play list 420. The program selector 502 then outputs the selected program signal 510, which is then provided to regional office 130 (FIG. 1) via access network 120 to the IPTV or VOD gateway 212. The regional office 130 then streams the selected program over access network 120 and to the gateway 212. Gateway 212 provides the encoded multimedia stream to decoder 316. Decoder 316 decodes the program into a native format and provides the decoded stream to the display 318.

Figure 6:
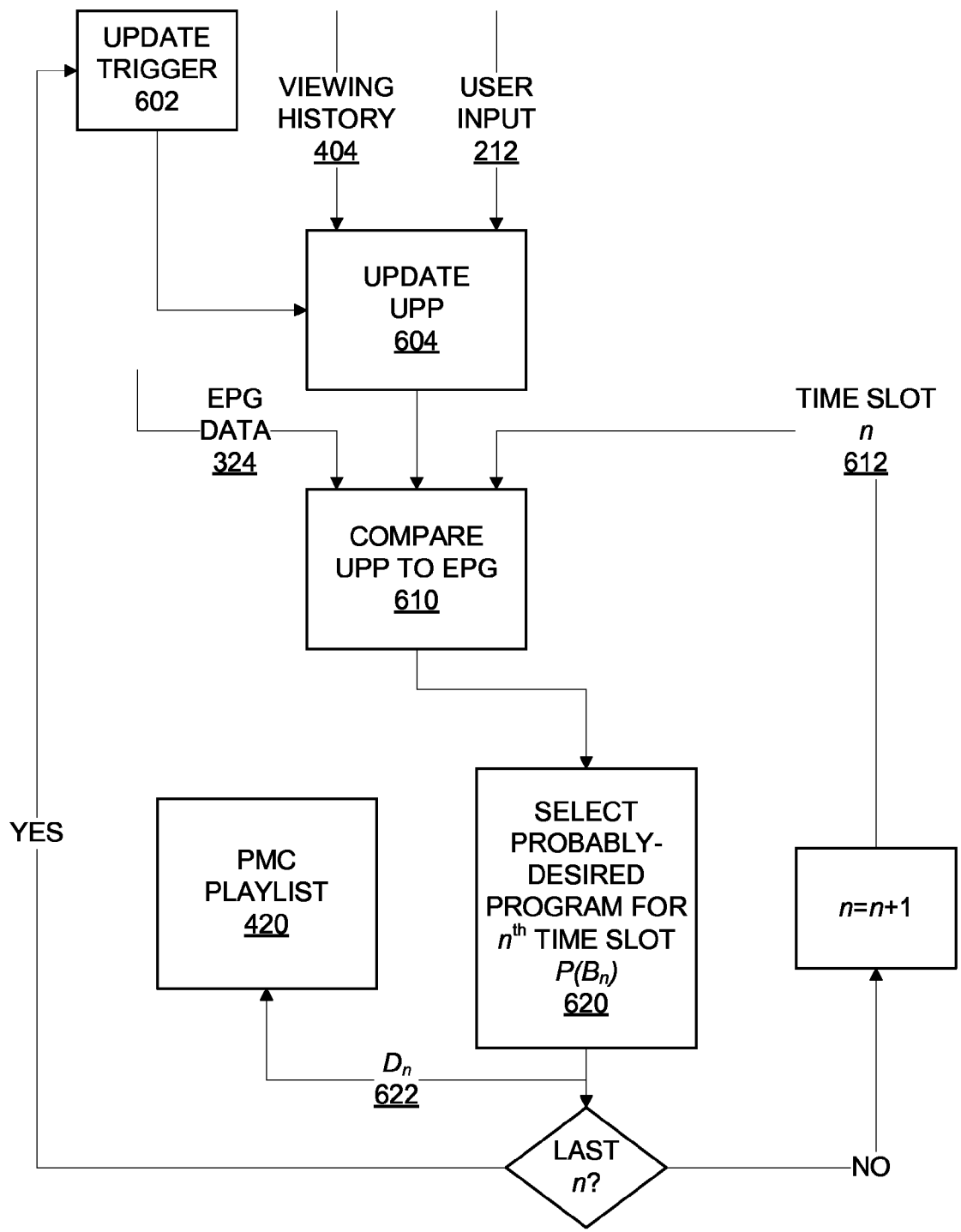
FIG. 6 is a block diagram showing a process for creating a play list for use in a personalized multimedia channel.

Turning to FIG. 6, there is shown a flow-chart of selected elements of the operation of an embodiment of a relevance engine 306. The depicted embodiment of relevance engine 306 is responsive to an update trigger 602. The update trigger may include any event that requires the UPP to be updated. For example, update triggers may include a user entering manual input, the user manually selecting a program from the EPG, a user accepting a program provided by the PMC, a user rejecting a program provided by the PMC, a program beginning or ending, or a fixed time interval. When an update trigger 602 occurs, the relevance engine 306 updates the UPP 310 as shown in step 604. Step 604 may receive as an input a viewing history 404 and user input 212. After the UPP 310 has been updated, the relevance engine 306 compares the UPP 310 to EPG data 324 in step 610. This process receives as input the updated UPP 310 and EPG data 324. In some embodiments, step 610 will operate on a discrete timeslot, designated as time slot n 612. This provides for an iterative update wherein a PMC play list 420 can be generated for a plurality of consecutive or non-consecutive timeslots. After comparing the UPP 310 to EPG data 324, there is a process 620 of selecting a probably-desired program for the $n^{th}$ timeslot. This is designated as $P(B_n)$. This notation represents the probability that $B_n$, which may represent a single available program, is the desired program for its time slot. After the probably-desired program has been selected in 620, then the PMC play list is updated as in 420 by receiving $D_n$ 622, which represents the probably-desired program for timeslot n. There is also a check to see if the last n has been reached, if not, then n is incremented and a new time slot n 612 is delivered to step 610, wherein the UPP to EPG comparison again takes place. If the last n has been reached, then the relevance engine 306 again waits for an update trigger.

The calculation of $P(B_n)$ may be accomplished using a number of mathematical or logical processes. By way of non-limiting illustration, a number of possible processes are herein described. In one example, $P(B_n)$ may be computed with a simple comparison process. This may involve reading preference fields from the UPP 310 and comparing them to corresponding fields from EPG data 324. The comparison may be a simple Boolean operation, yielding a 1 for a match and a 0 for a non-match. For each program, the values for the several fields can be added, yielding a profile for the total number of matches in any given program. In alternative embodiments, certain fields may be more heavily weighted. For example, if a user indicates, directly or through viewing history, that actors are more important than running time, the actor field may be more heavily weighted than the running time field. In another alternative embodiment, certain values within a field may be more heavily weighted. For example, if a user indicates, directly or through viewing history, a prioritized list of preferred actors, the actor at the top of the list may be weighted more heavily than the actors at the bottom of the list.

In yet another exemplary embodiment, a mathematical probability function may be used to calculate the probability that a particular program is desired. In this case, a conditional probability function may be appropriate. Conditional probability may be expressed generically by the following equation:

$$P[A \mid B] = \frac{P[A \cap B]}{P[B]}; P[B] > 0.$$

This equation calculates the probability of A, given B. For example, A may represent the probability that a particular program is desired, and B may represent any number of variables, such as a certain program has been selected previously, a user has accepted a certain program, a user has rejected a certain program, a user has manually entered a certain preference, or some other variable. The probability of A then is calculated by computing the probability of the intersection of A and B, divided by the probability of B alone, assuming that B is not zero.

A special form of a conditional probability function that may also be useful is given by Bayes' Rule. This may be expressed in the form:

$$P[B_j \mid A] = \frac{P[A \mid B_j]P[B_j]}{\sum_{k=1}^{n} P[A \mid B_k]P[B_k]}.$$

Bayes' Rule, also sometimes called the Beysian probability function, is useful when the probability of $B_j$ may be a partition of a sample space S. For each $B_j$, there is an a priori probability, representing the natural probability. For example, in the present specification, the a priori probability that a program is desired may be equal for all programs of a given time slot. Bayes' Rule then allows for an a posteriori computation of the probability, given that A has occurred. In this case, A may be any of the variables describe for B above. In this sense, the application of Bayes' rule may be similar to its use in many modern "spam" filters, which compute that probability that a given message is spam based on its similarity to other messages marked as "spam" or "not spam" in the past.

While the disclosed subject matter is described in connection with one or more embodiments, it is not intended to limit the scope of the claims to the particular embodiments set forth. On the contrary, the claims are intended to cover alternatives, modifications and equivalents that would occur to one or ordinary skill in the applicable field of endeavor having the benefit of this disclosure.

What is claimed is:

1. A method, comprising:
   accessing available program information indicating a plurality of multimedia content programs available during a time slot;
   identifying a best program available during the time slot for a user based on a user preference profile associated with the user;
   responsive to detecting a programming guide request, streaming an electronic programming guide interface encompassing a plurality of time slots, wherein the electronic programming guide interface includes a user preference channel entry corresponding to a user preference channel, wherein the user preference channel entry indicates a best program available for each of the plurality of time slots;
   receiving a best program transmission request generated responsive to the user selecting, from the electronic programming guide, the user preference channel entry; and
   responsive to receiving the transmission request, streaming the best program available over the user preference channel.

2. The method of claim 1, wherein identifying the best program includes comparing program metadata indicating characteristics of the plurality of multimedia content programs with the user preference profile.

3. The method of claim 2, wherein the user preference profile indicates user preferences for a plurality of fields, and wherein comparing program metadata with the user preference profile includes:
   associating portions of the program metadata with corresponding user preference profile fields.

4. The method of claim 3, wherein the user preference profile includes a genre field, an actor field, a running time field, a rating field, and a director field.

5. The method of claim 2, wherein identifying the best program includes invoking a probability function.

6. A multimedia device, comprising:
   a processor;
   a network interface to couple the processor to a multimedia program network; and
   a computer readable medium including processor executable relevance engine instructions, which when executed by the processor cause the processor to perform operations comprising:
      accessing user-specific ratings for a plurality of multimedia content programs available from a multimedia content distribution network; and
      identifying, from a plurality of channels included in an electronic programming guide for a time slot, a best program for a time slot based on the user-specific ratings;
      responsive to detecting a programming guide request, streaming an electronic programming guide interface encompassing a plurality of time slots, wherein the electronic programming guide interface includes a user preference channel entry corresponding to a user preference channel, wherein the user preference channel entry indicates a best program available for each of the plurality of time slots;
      receiving a best program available request generated responsive to the user selecting, from the electronic programming guide, the user preference channel entry; and
      responsive to receiving the transmission request, streaming the best program available over the user preference channel.

7. The device of claim 6, wherein accessing the user-specific ratings includes generating the user-specific ratings based at least in part on a locally-stored user preference profile.

8. The device of claim 7, wherein the operations include updating the user preference profile in response to user feedback.

9. The device of claim 7, wherein generating the user-specific ratings includes user preference profile values with content metadata values.

10. The device of claim 7, wherein generating the user-specific ratings includes invoking a probability function.

11. The device of claim 10, wherein the probability function is a conditional probability function of a form:

$$P[A \mid B] = \frac{P[A \cap B]}{P[B]}; P[B] > 0.$$

12. The device of claim 10, wherein the probability function is a Bayesian function of a form:

$$P[B_j \mid A] = \frac{P[A \mid B_j]P[B_j]}{\sum_{k=1}^{n} P[A \mid B_k]P[B_k]}.$$

13. The device of claim 7, wherein generating the user-specific ratings is based at least in part on a program viewing history of the user.

14. A computer readable memory including stored, processor executable program instructions, which when executed by a processor cause the processor to perform operations comprising:
   accessing available program information indicating a plurality of multimedia content programs available during a time slot;
   identifying, based on a user preference profile associated with a user, a best program available during the time slot for the user;
   responsive to detecting a programming guide request, streaming an electronic programming guide interface encompassing a plurality of time slots, wherein the electronic programming guide interface includes a user preference profile entry corresponding to a user preference channel, wherein the user preference profile entry indicates a best program available for each of the plurality of time slots;
   receiving a best program available transmission request generated responsive to the user selecting, from the electronic programming guide, the user preference channel entry; and
   responsive to receiving the transmission request, streaming the best program available over the user preference channel responsive to a user selecting the user preference channel within the time slot.

15. The computer readable memory of claim 14, wherein the operations include:
   updating the user preference profile in response to user feedback.

16. The computer readable memory of claim 14, wherein the operations include:
   accessing user preference values corresponding to a set of preference types;
   parsing electronic programming guide data to extract electronic programming guide values corresponding to the user preference values; and
   comparing the electronic programming guide values to the user preference values.

17. The computer readable memory of claim 16, wherein the set of preference types is selected from a genre type, an actor type, a running time, and a director.

18. The computer readable memory of claim 14, wherein identifying the best program includes invoking a probability function.

19. The computer readable memory of claim 18, wherein the probability function is a conditional probability function of a form:

$$P[A \mid B] = \frac{P[A \cap B]}{P[B]}; P[B] > 0.$$

20. The computer readable memory of claim 18, wherein the probability function is a Bayesian function of a form:

$$P[B_j \mid A] = \frac{P[A \mid B_j]P[B_j]}{\sum_{k=1}^{n} P[A \mid B_k]P[B_k]}.$$

* * * * *